(12) United States Patent
Marukawa et al.

(10) Patent No.: US 6,517,966 B1
(45) Date of Patent: Feb. 11, 2003

(54) STRUCTURE FOR CONNECTING A PLURALITY OF BATTERY MODULES TO CONSTITUTE A BATTERY PACK

(75) Inventors: Shuhei Marukawa, Toyohashi (JP); Ko Watanabe, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 30 days.

(21) Appl. No.: 09/684,251

(22) Filed: Oct. 6, 2000

(30) Foreign Application Priority Data

Oct. 8, 1999 (JP) .............................................. 11-288794

(51) Int. Cl.[7] ........................ H01M 2/34; H01M 10/50; H01M 2/02
(52) U.S. Cl. ........................ 429/120; 429/157; 429/159; 429/176
(58) Field of Search ................................ 429/157, 120, 429/159, 176

(56) References Cited

U.S. PATENT DOCUMENTS 5,663,007 A 9/1997 Ikoma et al.

5,817,435 A * 10/1998 Shimakawa et al. ......... 429/176

FOREIGN PATENT DOCUMENTS

| EP | 0817287 | 1/1998 |
| EP | 1091438 | 4/2001 |

* cited by examiner

*Primary Examiner*—John S. Maples
(74) *Attorney, Agent, or Firm*—Jordan and Hamburg LLP

(57) ABSTRACT

A plurality of prismatic cell cases having short lateral walls and long lateral walls are coupled together such that each of the short lateral walls of these cell cases is common to two adjacent cell cases as partitions, thereby constituting an integral battery case of a battery module. Each of the cell cases respectively accommodating therein elements for electromotive force, and electrode connecting terminals of positive and negative polarities are arranged at lengthwise opposite ends of the battery module. A large number of projections are formed dispersedly on both side faces of the battery module for forming coolant passages between two battery modules when butted with corresponding plurality of projections formed on both sides of an adjacent battery module. The height of the projections positioned opposite the partitions in the integral battery case is set lower than the height of the other projections.

4 Claims, 6 Drawing Sheets

STRUCTURE FOR CONNECTING A PLURALITY OF BATTERY MODULES TO CONSTITUTE A BATTERY PACK

BACKGROUND OF THE INVENTION

The present invention relates to a battery module, and particularly to an improved structure for connecting a plurality of such battery modules arranged adjacent each other to constitute a battery pack.

A known battery pack is constructed with a plurality of prismatic battery modules coupled adjacent each other and connected in series. End plates are arranged on the opposite ends in the direction of arrangement of the battery modules, and the battery modules are coupled together by binding these end plates with restricting bands. In such battery pack, a large number of projections are formed dispersed on both sides of each battery module so that coolant passages are formed between the plurality of battery modules when they are abutted adjacent each other. Moreover, locating protrusions and corresponding indentations are provided on both side faces of each battery module, that couple each other when the plurality of battery modules are aligned adjacent, thereby determining relative positions of neighboring battery modules.

The battery pack of this type is herein described with reference to FIGS. 7A, 7B, and 8. One battery module 31 comprises an integral battery case 32, that is formed by mutually coupling a plurality of prismatic cell cases 33 having short lateral walls and long lateral walls such that each of the short lateral walls of these cell cases is common to two adjacent cell cases as partition walls 34. Each cell case 33 accommodates therein elements for electromotive force in a sealed condition. A positive electrode connecting terminal 35 and a negative electrode connecting terminal 36 are respectively arranged at opposite ends in the lengthwise direction of the integral battery case 32. On both side faces of the battery module 31, ribs 37 are formed at positions corresponding to the partition walls of each two neighboring cell cases, so that, when two battery modules 31 are arranged adjacent each other, they abut each other and together form coolant passages 40 between the battery modules. Further, a large number of projections 38 are protruded in a matrix fashion between the ribs 37. Both of the ribs 37 and the projections 38 have the height.

Moreover, as shown in FIG. 8, locating protrusions 41 and corresponding indentations 42 for receiving the locating protrusions when two battery modules are arranged side by side, for determining relative positions of neighboring battery modules 31 in a direction orthogonal to the direction of arrangement of the battery modules, are provided at opposite ends on both side faces of the battery module 31. More specifically, at one end of the battery module, a protrusion 41 is protruded on one side while an indentation 42 is formed on the other side, and at the other end of the battery module, an indentation 42 is formed on one side while a protrusion 41 is protruded on the other side.

However, there was the following problem in the above connecting structure of the battery pack. That is, there are inevitably variations in the width W (FIG. 7A) of each battery module 31, and if the variation occurs on the plus side, the integral battery cases 32 of the battery modules 31 will be subject to a great load of compression, because the battery pack is constructed with the plurality of battery modules 31 arranged adjacent each other and bound tightly together. In addition, each integral battery case 32 receives a load from the inside of the battery module, that is generated by rises in the internal pressure of the battery module upon expansion of electrode plate group during charging and discharging or upon generation of gas. As a result, the end plates are deformed because of an excessive load, whereupon the battery modules can no longer be tied together.

Furthermore, since the locating protrusions 41 and indentations 42 are arranged such as shown in FIG. 8, it is possible to connect two battery modules 31 side by side, the protrusions 41 respectively fitting into corresponding indentations 42 as shown in FIG. 9, in a state that the connecting terminals 35, 35 and 36, 36 of positive polarity and of negative polarity are aligned adjacent each other. Therefore, there is the risk that the battery modules 31 can be connected by mistake in such a wrong arrangement.

SUMMARY OF THE INVENTION

In view of these problems of the prior art, it is an object of the present invention to provide an improved structure for connecting battery modules to construct a battery pack, wherein the load exerted to each of the battery modules that are bound together can be reduced, whereby deformation of end plates can be prevented, and there is no risk of connecting electrode connecting terminals of the same polarity of two neighboring battery modules by mistake.

To achieve the above object, a battery module according to the present invention comprises:

a plurality of prismatic cell cases having short lateral walls and long lateral walls coupled together such that each of the short lateral walls of these cell cases is common to two adjacent cell cases as partitions, thereby constituting an integral battery case, and each of the cell cases respectively accommodating therein elements for electromotive force; and a plurality of projections formed dispersedly on both side faces of the battery module for forming coolant passages between two battery modules when butted with corresponding plurality of projections formed on both sides of an adjacent battery module, wherein part of the projections positioned opposite the partitions in the integral battery case have a height smaller than the other projections.

According to the battery module of the present invention, when a plurality of battery modules are arranged side by side and bound together with a pair of end plates arranged at their opposite ends, even when there is variation on the plus side in the width of the battery modules, it can reliably be prevented that the portions of the battery module corresponding to the partitions of the cells are subject to excessive compression load exerted on the integral battery case in addition to the load generated within the battery module. Accordingly, the end plates can be prevented from being deformed by an excessive binding load.

Moreover, a battery module according to the present invention comprises:

a prismatic battery case;

a connecting terminal of positive polarity and a connecting terminal of negative polarity arranged respectively at lengthwise opposite ends of the battery case; and a plurality of protrusions and a plurality of indentations formed on both side faces of the battery case at positions near the lengthwise opposite ends of the battery case symmetrical with respect to a centerline in the lengthwise direction of the battery case, wherein the protrusions are in pairs formed opposite each other to protrude from opposite side faces of the battery case, and the indentations are in pairs formed opposite each other on the opposite side faces of the battery case.

With this arrangement, when neighboring battery modules are arranged wrongly such that their connecting terminals of the same polarity are aligned in the same direction, the locating protrusions of one battery module cannot fit into the indentations of the other battery. Therefore, battery modules can always be arranged adjacent each other such that the connecting terminals of opposite polarity are aligned alternately, whereby the risk of short-circuiting by joining connecting terminals of the same polarity is eliminated.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

One embodiment of a battery pack wherein a battery module according to the present invention is applied will be hereinafter described with reference to FIG. 1 to FIG. 6.

Figure 1:
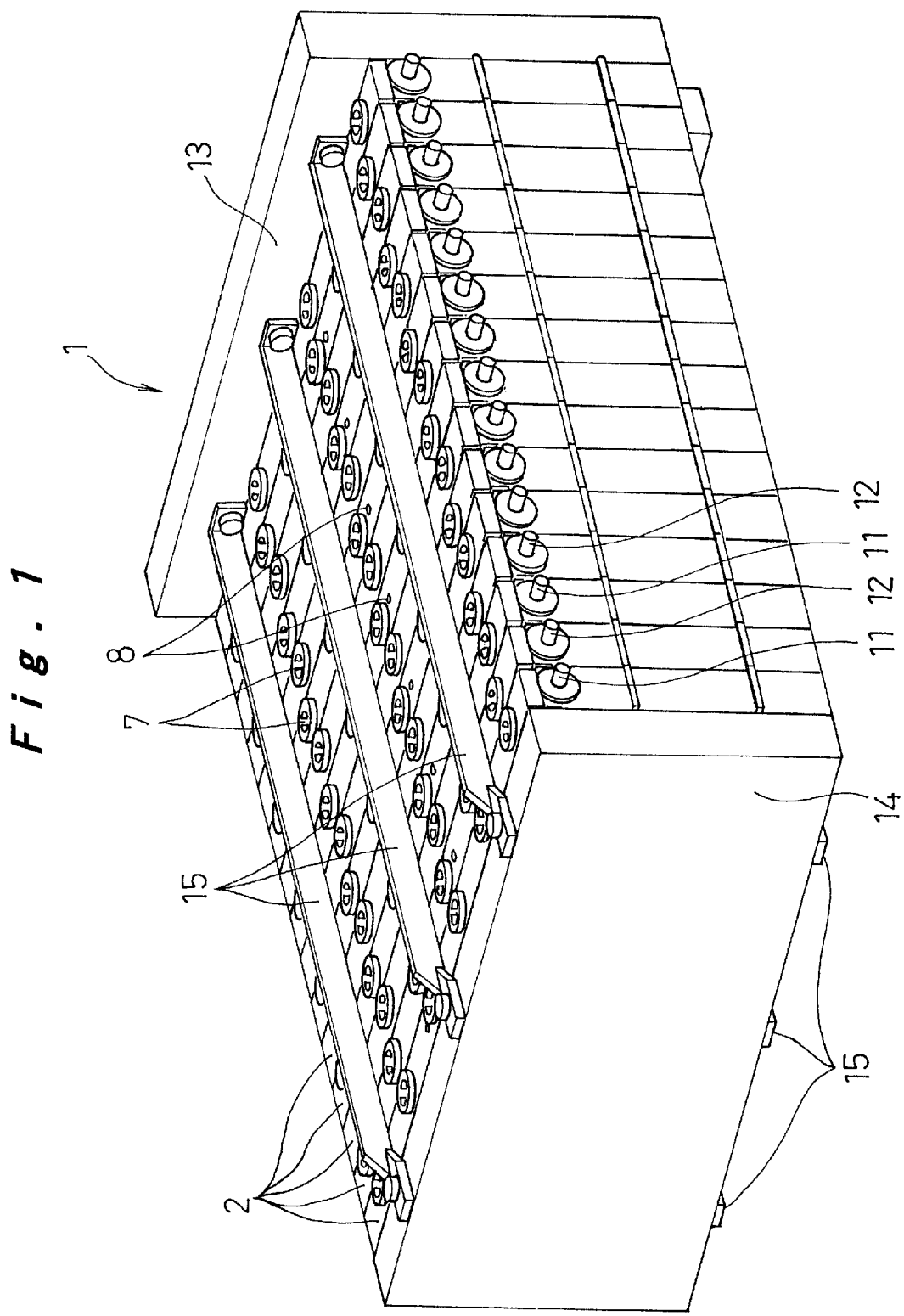
FIG. 1 is a perspective view of a battery pack according to an embodiment of the present invention.
Figure 2:
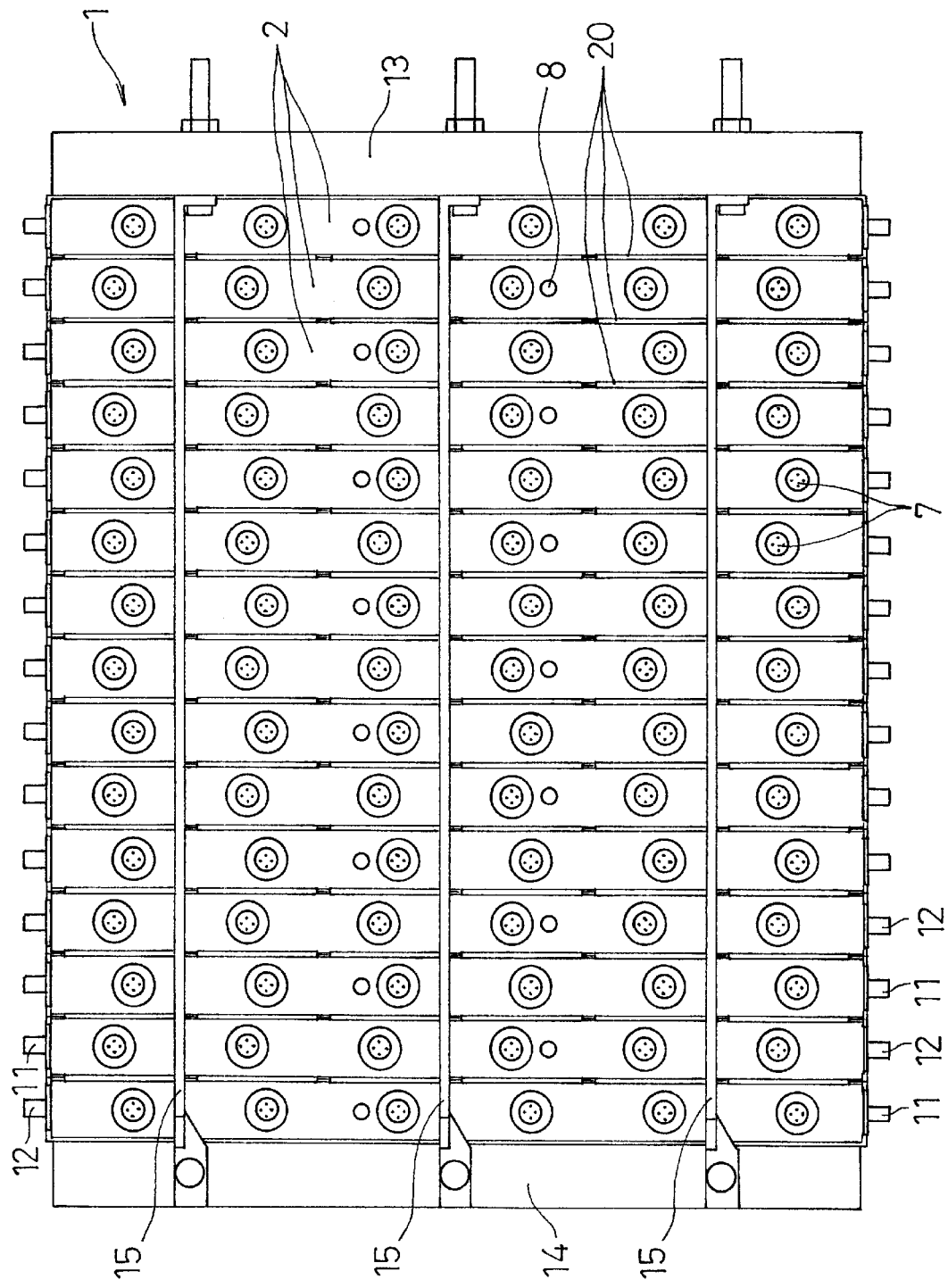
FIG. 2 a plan view of a battery pack of this embodiment.
Figure 6:
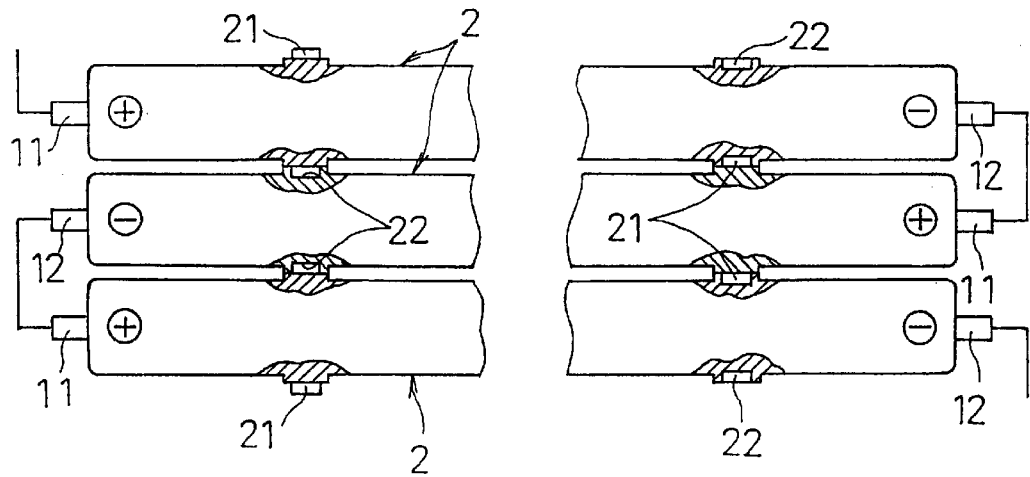
FIG. 6 is a diagram given in explanation of the parallel arrangement of a plurality of battery modules according to this embodiment.
Figure 7A:
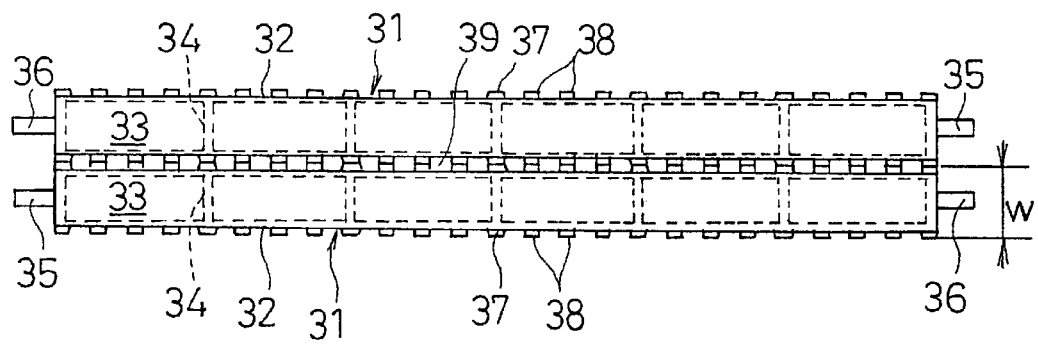
FIG. 7A is a plan view and FIG. 7B is a partially enlarged sectional view, showing major parts of conventional battery modules.
Figure 7B:
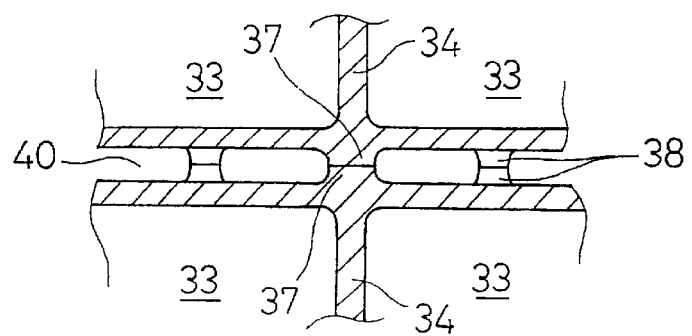
Figure 8:
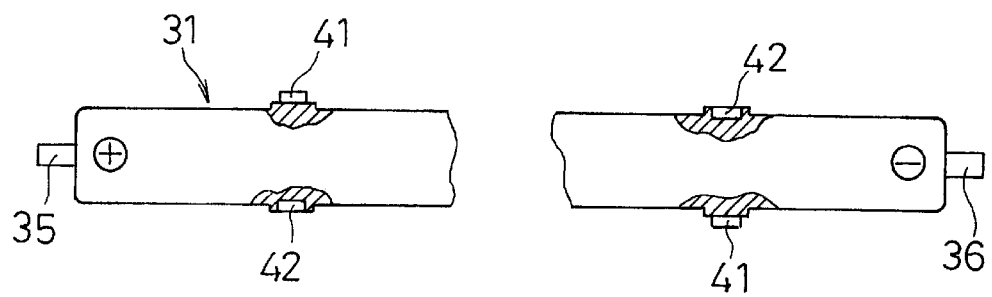
FIG. 8 is a partially sectional plan view of this conventional battery module.
Figure 9:
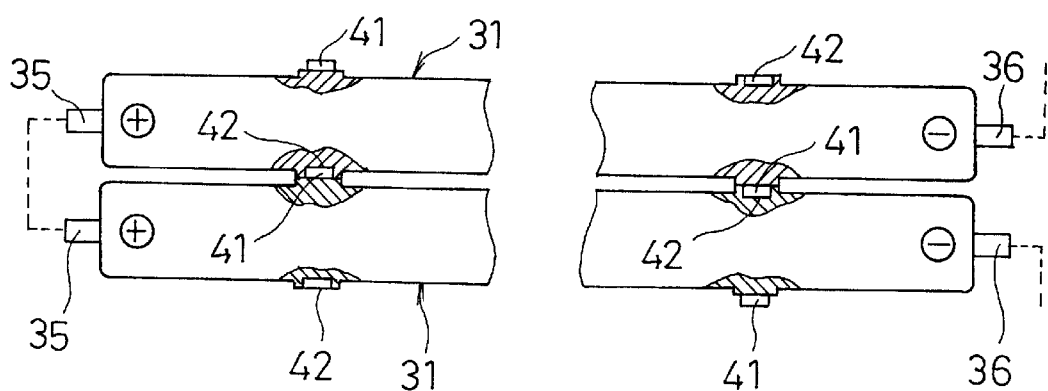
FIG. 9 is a diagram given in explanation of a wrong parallel arrangement of a plurality of battery modules that could occur with this conventional battery module.

In FIG. 1 and FIG. 2, a battery pack 1 according to this embodiment is constituted such that it can conveniently be employed as the drive power source for an electric vehicle and is constituted by arranging adjacent each other a plurality (in the example illustrated, 15) of prismatic battery modules 2 of flat plate shape comprising nickel metal hydride batteries. Positive electrode and negative electrode connecting terminals 11, 12 project at the upper ends of both end faces in the direction of elongation of battery modules 2, the positive electrode and negative electrode connecting terminals 11, 12 of battery modules 2 being adjacently arranged so as to be alternately in opposite directions as shown in FIG. 6; thus, battery modules 2 are connected in series by sequential mutual connection of adjacent connecting terminals 11, 12. End plates 13, 14 are arranged at both ends in the direction of adjacent arrangement of the battery modules 2, their upper ends and lower ends being tied together by a plurality of restraining bands 15 respectively arranged with a suitable separation, whereby a battery pack 1 is constituted as an integral body.

Figure 3:
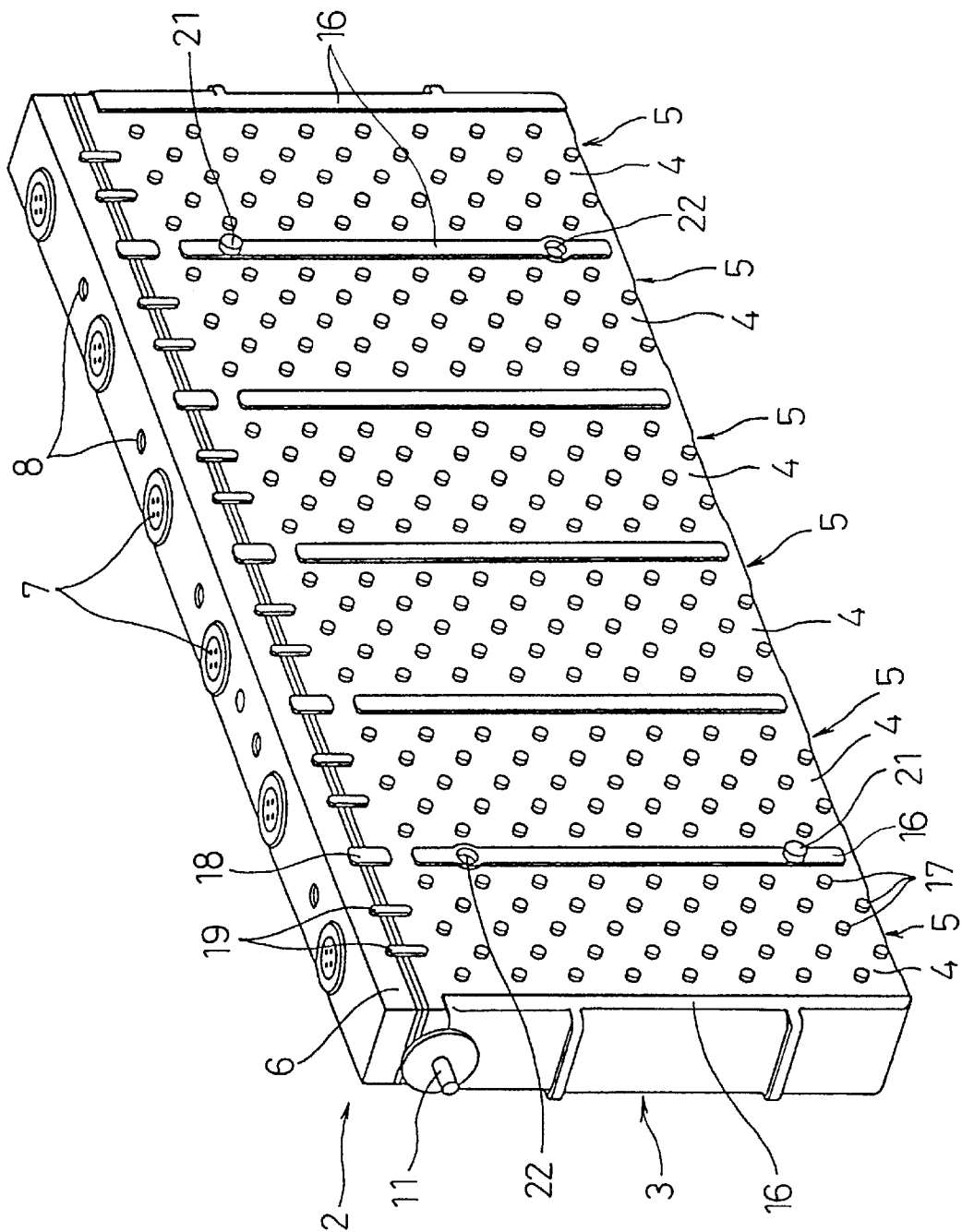
FIG. 3 is a perspective view showing a battery module according to the same embodiment.
Figure 4A:
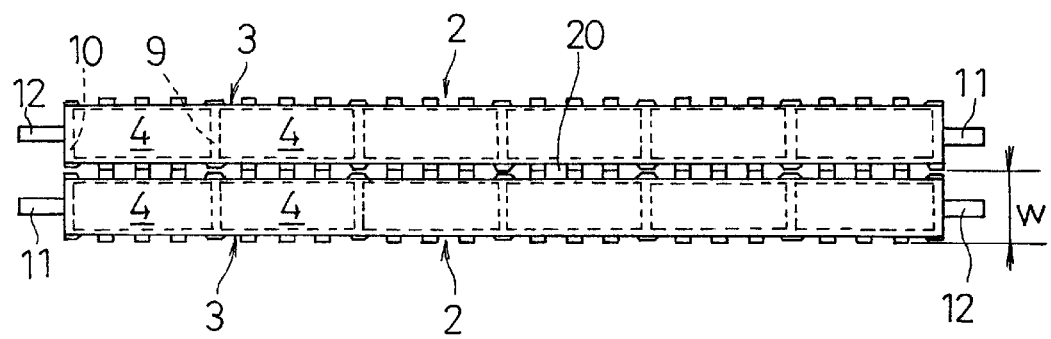
FIG. 4A is a plan view and FIG. 4B is a partially enlarged sectional view, showing major parts of the battery modules of this embodiment.

As shown in FIG. 3 and FIG. 4, battery modules 2 are constituted by an integral battery case 3 formed by mutually unitarily linking a plurality (in this embodiment, six) of rectangular prismatic cell cases 4 having short lateral walls and long lateral walls, the short lateral walls being shared as partitions 9 between the cell cases 4, 4, and the outside short lateral walls of the cell cases 4 at both ends constituting the end walls 10 of the integral battery case.

Cells 5 are constituted by accommodating electrolyte and electrode groups consisting of a large number of positive electrode plates and negative electrode plates within cell cases 4 parallel with the long lateral walls and stacked in the direction of the short lateral walls with intervening separators. A battery module 2 is constituted by connecting these six cells 5 in series within an integral battery case 3, connecting terminals 11, 12 being connected to the cells at both ends.

The upper end of the integral battery case 3 is closed by a lid 6 that is integrally joined thereto. In this lid 6 there is arranged a safety vent 7 for releasing pressure when the internal pressure of the cells reaches a predetermined value. Also, temperature detection holes 8 fitted with temperature detection sensors for detecting the temperature of each cell 5 are formed therein.

Figure 4B:
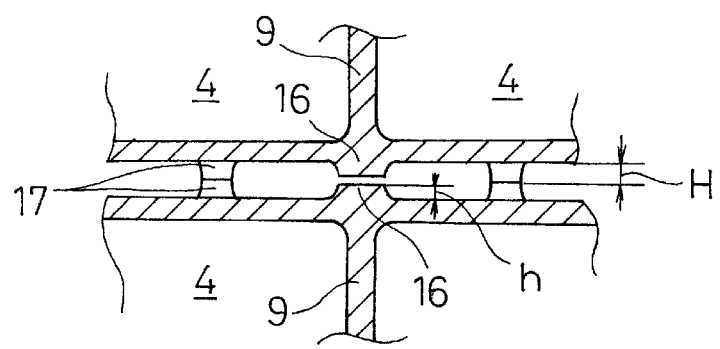

The long lateral walls of six cells 5 together form an integral side face of the integral battery case 3. On both side faces of the integral battery case 3, rib-shaped projections 16 extending vertically in positions opposite partitions 9 and end walls 10 of the two side ends of cell cases 4 are provided, and a large number of comparatively small circular projections 17 or the like are provided in a matrix arrangement with a suitable pitch between rib-shaped projections 16, 16. As shown in FIG. 4B, the height h of the rib-shaped projections 16 opposite partitions 9 and end walls 10 of cell cases 4 is set lower than the height H of the circular projections 17.

It is of course possible to provide, instead of circular projections 17, a plurality of parallel ribs at suitable intervals between the rib-shaped projections 16. Furthermore, coupling ribs 18 and 19 having the same height as the rib-shaped projections 16 and the circular projections 17 are formed on the side walls of the upper edge of the integral battery case 3 and the side walls of the lid 6, such as to bridge across the side walls of the cell cases 4 and the lid 6, at positions corresponding to an extension of the rib-shaped projections 16 and the circular projections 17. When a plurality of battery modules 2 are arranged in a row in parallel to constitute a battery pack, the rib-shaped projections 16, the circular projections 17, and the coupling ribs 18 and 19 form coolant passages 20 for cooling the cell cases 4 effectively and uniformly.

Figure 5:
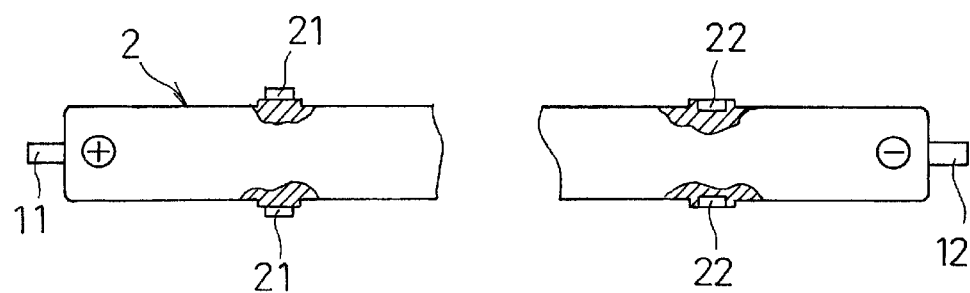
FIG. 5 is a partially sectional plan view of the battery module of this embodiment.

Protrusions 21 and indentations 22, for positioning and fitting together battery modules 2 when they are abutted on each other, are arranged at an upper portion and a lower portion of the outer surface of the two rib-shaped projections 16 near both ends of the long side wall of the integral battery case 3, as shown in FIG. 3 and FIG. 5. The protrusions 21 and indentations 22 are positioned symmetrical with respect to the centerline in the lengthwise direction of the battery module 2 on both side faces of the integral battery case 3. At one end of the battery module 2, the protrusions 21 project from the opposite side faces of the battery module 2, while the indentations 22 are formed at the other end of the battery module 2 on the opposite side faces of the battery module 2.

In the battery pack 1 of the present invention described above, a plurality of battery modules 2 are arranged adjacent each other, a pair of end plates 13, 14 are arranged at opposite ends of these battery modules, and they are all bound together with restricting bands to be an integral body. In this state, there are formed a plurality of coolant passages 20 between each adjacent battery modules 2, 2, and each of the battery modules 2 can be effectively and uniformly cooled by forcibly flowing cooling air through these coolant passages 20. Accordingly, the power output characteristics and the life of the battery pack 1 can be improved.

The predetermined number of battery modules 2 are bound together as arranged adjacent each other and thus their dimensions are restricted to fixed values. Even when there is variation on the plus side in the width W of the integral battery case 3 of battery module 2, such can be accommodated by elastic deformation of side walls of the integral battery case 3 except for portions corresponding to the partitions 9 between each two adjacent cells in the battery module. Also in such portions of the side walls of the integral battery case 3 corresponding to the partitions 9, because the height h of the rib-shaped projections 16 is set lower than the height H of the circular projections 17 as shown in FIG. 4B, there is a gap between the opposed rib-shaped projections 16, whereby the variation on the plus side of the integral battery case 3 can readily be accommodated. Therefore, while the portions corresponding to the partitions 9 between each two cells are hardly deformable, the compression load that the integral battery case 3 receives in addition to the load generated from the inside of each cell 5 of the battery module 2 can be prevented from being excessive at these portions. Accordingly, the end plates 13, 14 can be prevented from being deformed by an excessive binding load.

When two battery modules 2, 2 are arranged next to each other such that their connecting terminals 11, 11 or 12, 12 of the same polarity are aligned in the same direction, the protrusions 21 abut each other and the indentations 22 oppose each other, and coupling of a protrusion and an indentation 22 cannot be achieved. This fact that protrusions or indentations oppose each other indicates that the battery modules 2, 2 are arranged wrongly. Accordingly, battery modules can always be arranged adjacent each other such that the connecting terminals 11, 12 of opposite polarity are aligned alternately as shown in FIG. 6, whereby the risk of joining connecting terminals of the same polarity is eliminated.

According to the battery module of the present invention, as is clear from the above, a large number of projections are formed dispersedly on both side faces of the battery module, which form coolant passages between battery modules when they are arranged side by side by butting each other, wherein the height of the projections positioned opposite the partitions between each two cells in a battery module is set lower than the height of other projections. Therefore, when a plurality of battery modules are arranged side by side and bound together with a pair of end plates arranged at their opposite ends, even when there is variation on the plus side in the width of the battery modules, it can reliably be prevented that the portions of the battery module corresponding to the partitions of the cells are subject to excessive compression load exerted on the integral battery case in addition to the load generated within the battery module. Accordingly, the end plates can be prevented from being deformed by an excessive binding load.

Moreover, locating protrusions and indentations for receiving the protrusions, for determining relative positions of neighboring battery modules when they are arranged adjacent each other, are formed at both ends in the lengthwise direction of the battery module at positions symmetrical with the centerline in the lengthwise direction of the battery module, such that protrusions project from opposite side faces of the battery module, and the indentations are formed on the opposite side faces of the battery module. With this arrangement, when neighboring battery modules are arranged wrongly such that their connecting terminals of the same polarity are aligned in the same direction, the locating protrusions of one battery module cannot fit into the indentations of the other battery. Therefore, battery modules can always be arranged adjacent each other such that the connecting terminals of opposite polarity are aligned alternately, whereby the risk of short-circuiting by joining connecting terminals of the same polarity is eliminated.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:
   a plurality of prismatic cell cases having short lateral walls and long lateral walls coupled together such that each of the short lateral walls of these cell cases is common to two adjacent cell cases as partitions, thereby constituting an integral battery case, and each of the cell cases respectively accommodating therein elements for electromotive force; and
   a plurality of projections formed dispersedly on both side faces of the battery module for forming coolant passages between two battery modules when butted with corresponding plurality of projections formed on both sides of an adjacent battery module, wherein
      part of the projections positioned opposite the partitions in the integral battery case have a height smaller than the other projections.

2. A battery pack comprising:
   a plurality of battery modules having connecting terminals of positive and negative polarities respectively at lengthwise opposite ends thereof, arranged adjacent each other oppositely such that the connecting terminal of positive polarity and the connecting terminal of negative polarity of two adjacent battery modules are aligned adjacent each other;
   each of the plurality of battery modules including:
      a plurality of prismatic cell cases having short lateral walls and long lateral walls coupled together such that each of the short lateral walls of these cell cases is common to two adjacent cell cases as partitions, thereby constituting an integral battery case, and each of the cell cases respectively accommodating therein elements for electromotive force; and
   a plurality of projections formed dispersedly on both side faces of the battery module for forming coolant passages between two battery modules when butted with corresponding plurality of projections formed on both sides of an adjacent battery module, wherein
      part of the projections positioned opposite the partitions in the integral battery case have a height smaller than the other projections;
   end plates arranged at lengthwise opposite ends of the plurality of battery modules arranged together; and
   restricting bands for coupling the battery modules and the end plates together.

3. A battery module comprising:

prismatic cell cases having short lateral walls and long lateral walls such that each of the short lateral walls common to two adjacent cell cases is a partition to constitute a integral battery case;

said prismatic cell cases respectively accommodating electromotive force elements; and a plurality of projections formed on both side faces the battery module for forming coolant passages between two battery modules, wherein de projections of said plurality of projections located opposite each partition has a height smaller than a height of the remaining projections of said plurality of projections.

4. A battery pak comprising:

battery modules;

each of said battery modules including:

prismatic cell cases having short lateral walls and long lateral walls such that each of the short lateral walls common to two adjacent cell cases is a partition to constitute a integral battery case;

said prismatic cell cases respectively accommodating electromotive force elements; and a plurality of projections formed on both side faces each battery module for forming coolant passages between two battery modules, wherein some of the projections of said plurality of projections located opposite each partition have a height smaller than a height of the remaining projections of said plurality of projections;

end plates arranged at lengthwise opposite ends of the battery modules being arranged together; and restricting bands for coupling the battery modules and the end plates together.

* * * * *